United States Patent
Majeau

[19]

[11] 3,878,528

[45] Apr. 15, 1975

[54] PASSIVE IDENTIFICATION SYSTEM

[75] Inventor: Henrie Lionel Majeau, Bellevue, Wash.

[73] Assignee: The Boeing Company, Seattle, Wash.

[22] Filed: Oct. 12, 1973

[21] Appl. No.: 405,744

[52] U.S. Cl. ............................................ 343/6.5 SS
[51] Int. Cl. ............................................. G01s 9/56
[58] Field of Search ...................... 343/6.5 SS, 6.5 R

[56] References Cited
UNITED STATES PATENTS

| | | | |
|---|---|---|---|
| 3,353,178 | 11/1967 | Wasterlid | 343/6.5 SS |
| 3,737,911 | 6/1973 | Sakuragi et al. | 343/6.5 SS |
| 3,774,205 | 11/1973 | Smith et al. | 343/6.5 SS |
| 3,798,641 | 3/1974 | Preti | 343/6.5 SS |
| 3,798,642 | 3/1974 | Augenblick et al. | 343/6.5 SS X |

*Primary Examiner*—T. H. Tubbesing
*Attorney, Agent, or Firm*—Christensen, O'Connor, Garrison & Havelka

[57] ABSTRACT

A transceiver-responder identification system which utilizes a swept frequency spectrum signal in the microwave frequency range. The energy generated by the transceiver portion is transmitted in a predetermined number of discrete frequency steps within a frequency octave. This swept spectrum signal is received by the responder portion, which doubles the stepped frequencies comprising the swept spectrum signal, and then routes the signal through a selective filter arrangement comprising a transmission line bounded by a series of directional ring filters, each filter being tuned to one of the frequencies in the swept spectrum signal. If the ring filter corresponding to a specific frequency is physically complete, the signal energy present at that frequency will be coupled into the ring and subsequently dissipated in a load. If the ring filter corresponding to a specific frequency is not physically complete, the signal energy at that frequency continues along the transmission line. This remaining signal energy is then retransmitted to the transceiver portion. By arranging complete and incomplete rings in a unique pattern for each responder in the system, each responder will then transmit a signal unique to the animal or article bearing the responder, which signal is decoded by the transceiver and coverted to a corresponding digital word comprising ones and zeros. This digital word provides a common format for article identification purposes. The ones and zeros correspond to the presence or absence of return signal energy at the various frequencies originally generated and transmitted to the responder.

9 Claims, 5 Drawing Figures

PASSIVE IDENTIFICATION SYSTEM

BACKGROUND OF THE INVENTION

A reference is made to copending application Ser. No. 405,743, entitled "Responder for Use in a Passive Identification System," and assigned to the same assignee as the present invention, and which is directed toward a responder useful in passive identification systems such as disclosed and claimed herein.

This invention relates generally to identification systems, and more particularly, to identification systems wherein given units in the identification system are passive.

At present, due to increasing automation, there is a significant need for inexpensive, reliable, passive identification systems. Passive identification systems are generally used where it is desirable to maintain selective, individual control over a large number of items comprising an inventory system which is constantly in a state of change. Thus, in a railroad or rapid transit system, for instance, it is desirable to maintain accurate identification and monitoring of the location of individual railroad cars comprising the moving stock of the system. Additionally, with respect to large stock inventories, it is desirable to maintain an accurate locator system for specific items or groups of items in an inventory which is being continuously updated and/or moved about.

Another example of a significant need for passive identification systems is in traditional farm activities, such as beef cattle farms and dairy farms. Particularly in the large beef feed lots, where cattle are typically fattened up on a special diet for several weeks before they are slaughtered, it is desirable to maintain accurate records concerning the weight growth of individual cattle with respect to the amount and kind of food they are eating. Currently, records are kept, if at all, by human observation and hand recording. Automated types of identification systems to date have either been too expensive or too bulky to place on the individual animals. With respect to beef cattle, it is currently necessary to individually weight the cattle and maintain weight records by hand. Identification of individual cattle and recording of growth by these methods have led to errors. Because of these errors and the inherent cumbersomeness of the methods, there exists a significant uncertainty with respect to the maximization of further weight gain of individual cattle with respect to the cost of additional feed.

Thus, with respect to the beef cattle industry, the dairy industry, railroad and mass transit industries, and other industrial situations involving large inventories of individual items, there is a need for an identification system which is inexpensive, reliable and small enough not to interfere with the movement of the animals or articles in the monitored system.

In accordance with the above, it is a general object of the present invention to provide a passive identification system which overcomes the disadvantages of the prior art.

A further object of the present invention is to provide a passive identification system wherein identification of responder units is dependent on the presence or absence of selected frequencies in a frequency set transmitted to the transceiver by a given responder.

A still further object of the present invention is to provide a passive identification system wherein signals transmitted by a responder may be distinguished from background noise and other reflected signals.

Another object of the present invention is to provide a passive identification system capable of accommodating a large number of uniquely identifiable responder units.

SUMMARY OF THE INVENTION

In accordance with the preferred embodiment, the invention generally includes a transceiver, and at least one responder. The transceiver includes a signal generator which generates a series of stepped frequencies within a given frequency range. These frequencies are then transmitted to a responder, which passively processes the frequencies and retransmits predetermined frequencies back to the transceiver. The transceiver compares the original transmitted frequencies with the received frequencies from the responder to determine which of the originally transmitted frequencies are present in the retransmitted frequencies, and which are absent. An appropriate code word is then generated which is indicative of the results of this comparison, each responder unit thus being identified with a unique code word.

DESCRIPTION OF THE DRAWINGS

A more thorough understanding of the invention may be obtained by a study of the following detailed description taken in conjunction with the accompanying drawings in which.

DESCRIPTION OF THE PREFERRRED EMBODIMENT

Figure 1:
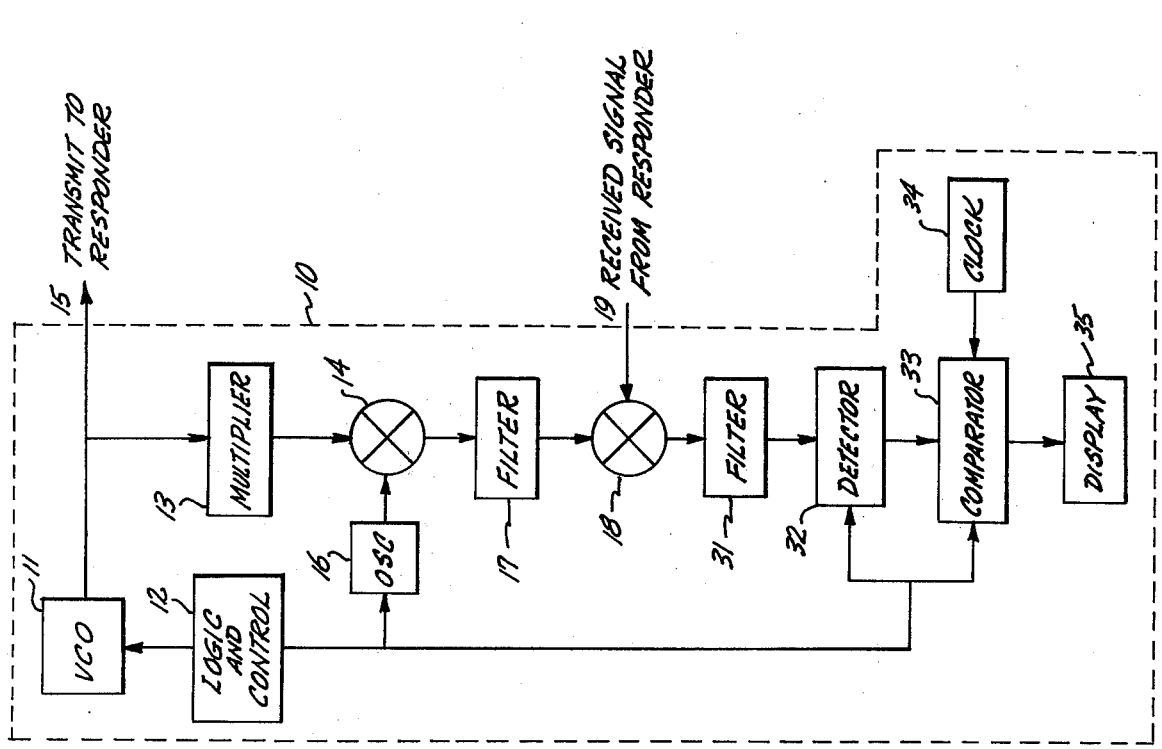
FIG. 1 is a blcok diagram of the transceiver portion of the passive identification system.
Figure 4:
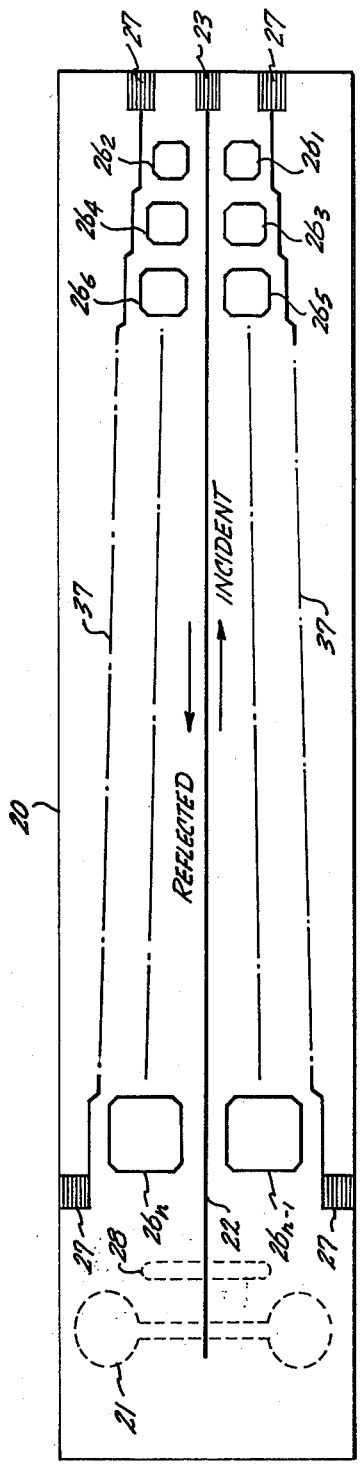
FIG. 4 is a pictorial representation of the responder portion of the passive identification system.

Referring to FIGS. 1 and 4, diagrams of a transceiver 10 and a responder 20 of the passive identification system of the present invention are shown. The transceiver 10 (FIG. 1), which is located typically at a fixed position in the identification system, uses a voltage controlled oscillator 11 under the control of logic circuitry 12 to generate a series of frequencies in the microwave range. The signal energy generated by the VCO sweeps through a predetermined octave range of frequencies or spectrum, the transmitted signal frequencies 15 varying in successive steps within that frequency octave range.

This swept spectrum signal energy is transmitted to a selected individual responder unit 20, which is located on the animal or other article which is to identified within the system. The responder must be within the effective range of the transceiver, on the order of 5 to 10 feet. Each animal or article in the system is provided with its own responder unit. The output of the VCO 11 is, simultaneously with transmission to the responder 20, applied to a multipler 13, which doubles each signal frequency in the swept spectrum output of VCO 11, the output of the multiplier 13 in turn being applied to a mixer 14. A local oscillator 16 supplies a second input to the mixer 14. The output of the mixer 14 (sum and difference frequencies) is applied to a filter 17, where the difference frequencies are removed, the output of filter 17 typically being the doubled VCO spectrum frequencies plus the frequency of the local oscillator 16. This series of signals is applied to a second mixer 18, the other input 19 of which is a signal received from the responder unit 20 (not shown in FIG. 1) which initially received the transmission 12 from the transceiver.

The operation of the responder 20 and the characteristics of the signal 19 from the responder 20 to mixer 18 will now be briefly explained, and in more detail in following paragraphs. The signal energy from the VCO 11 is, as explained above, to a given responder unit 20 such as shown in FIG. 4. The swept spectrum signal energy 15 is received by a receiving antenna 21 and applied down a transmission line 22 to a diode frequency multiplier 23, which doubles all the frequencies in the received swept frequency signal. The doubled signals are then transmitted back along the transmission line 22, where they encounter a series of directional ring filters, $26_1$–$26_n$, which are successively positioned along the transmission line, and successively tuned to the individual frequencies comprising the now doubled swept frequency spectrum. If a given directional ring filter to tuned to a particular frequency present in the swept spectrum, the signal energy present in the transmission line at that frequency will be coupled into the ring, from which it is coupled into a load 27 and there dissipated.

Typically, each frequency in the doubled swept spectrum has an associated ring filter positioned along transmission line 22. However, selected ring filters may be physically distorted, thereby preventing the coupling of signal energy present at that frequency into the ring. The signal energy present at those predetermined frequencies continues back along the transmission line 22 and is reradiated by a transmitting antenna 28 back to the transceiver 10. This transmitted signal 19 from the responder 20 is a plurality of predetermined doubled frequency signals, comprising those frequencies which were not coupled into their associated filter rings.

The signal energy radiated by responder 20 is received by transceiver 10 and applied to mixer 18 (FIG. 1). The output of mixer 18 (sum and difference frequencies) is filtered by filter 31, resulting in the difference frequencies between the output of filter 17 and responder signal 19 being applied to a conventional detector 32, which determines which frequencies are absent from the original spectrum of doubled transmitted frequencies, and which frequencies are still present. The output of the detector 18 is then applied to a comparator 33 which compares the output of detector 32 with a clock 34 output. The comparator 33 assigns ones and zeros to the individual positions, in time, of the frequencies of the original swept frequency signal 15, depending on whether a received frequency is present or absent with respect to the original transmitted signal. The comparator thus generates a digital word, the value of which is dependent upon the action of the responder ring filters $26_1$–$26_n$. The output of the comparator 33 is applied to an appropriate display 35 or other precessing apparatus for identification or record keeping of the article or animal bearing the responder unit.

More specifically, referring to FIG. 1, the voltage controlled oscillator (VCO) 11 generates a series of stepped frequencies within a single frequency octave, referred to as a swept frequency spectrum. The generated signals are in the microwave frequency range, with a typical frequency octave coverage being between 2 and 4 gigahertz.

The number of discrete frequencies within the frequencies within the frequency octave is a function of the size (in terms of bits) of the digital word required to uniquely identify every article or animal in the system, and also depends to an extent upon current technological limits with respect to minimum frequency separation to maintain adequate ring filter coupling in the responder units. In the present invention a 2.6 percent frequency spacing is maintained between successive frequencies in the swept frequency spectrum transmitted to the responder. A closer spacing may be achieved with current technology, although the 2.6 percent spacing results in a suitable safety factor for coupling purposes in the responder. A sufficient number of individual frequencies are present with this spacing in the 2 to 4 gigahertz frequency range to allow for a digital identification word having a 26-bit capacity ($n$ = 26 in FIG. 4). Thus, the number of individual elements which can be uniquely identified in such a system is $2^{26}$, a number sufficiently large to handle any contemplated system size at the present time.

Within the given octave frequency range of 2 to 4 gigahertz, the individual frequencies are generated by the VCO 11 under the direction and control of the logic and control circuitry 12, typically from the high frequency in the octave through the low frequency, at a predetermined rate. Typically, the repetition rate for the sweeping of the frequencies within the given range will be between 100 and 1,000 repetitions per second. Other repetition rates, however, may be utilized, depending on the particular application.

The swept frequency spectrum by the VCO 11 is simultaneously transmitted to a responder unit and applied to a X2 multiplier circuit 13 in the transceiver 10. The transmitted signal typically has an effective range of between 5 and 10 feet. The responder unit (FIG. 4) is sufficiently small to easily fit under the skin of animals, such as cattle or the like, or they may be easily secured to articles in an inventory system. The size of the responder unit 20 is approximately 1 ½ inches long by one-half inch wide by one-quarter inch deep when a substrate material with a dialectric constant of 40 is used. Material of other dialectric constants, e.g. 20, may be used, although this would increase the size of the responder. The circuitry on the substrate, e.g. the transmission lines and ring filters, are comprised of gold which has been deposited and then selectively etched. It is a fully passive responder in that it has no power source of its own, but rather utilizes the signals from the transceiver 10 for power to transmit the appropriate signals back to the transceiver.

In use, signal energy radiated from the transceiver 10 will impinge on a standard slot antenna 21 in the responder unit 20. The signal energy transmitted by the transceiver 10 and picked up by the slot antenna 21 is applied down a transmission line 22 in the responder 20 to a diode multiplier 23, which functions as a harmonic frequency generator. This diode multiplier 23 doubles the frequency of each individual frequency in the transmitted spectrum received by antenna 21.

This frequency doubling, which is also accomplished in the transceiver 10 by multiplier 13, allows for significantly more precise and clearer reception by the transceiver 10 of energy transmitted by the responder 20. Any background noise present at the transceiver 10 which is reflected by the animal or article bearing the responder unit may be effectively filtered out, because the reflected signal energy will be at the original transmitted frequencies. Transmitted signal energy from the responder unit 20, being frequency doubled, is thus easily ascertained and detected by the transceiver.

Figure 5:
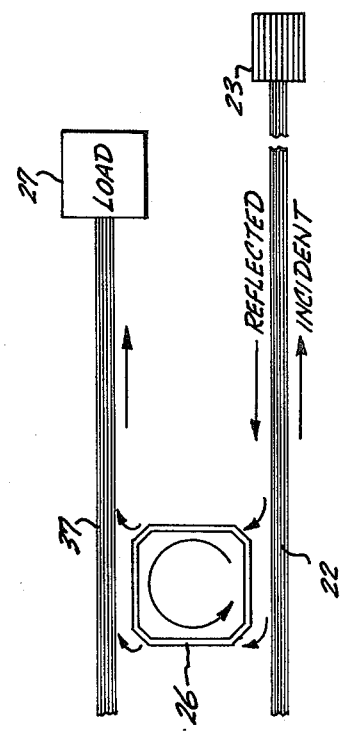
FIG. 5 is a diagram of one directional ring filter used in the responder.

After the frequencies present in the swept frequency spectrum are doubled by the diode multiplier 23, approximately 10 percent of the initial impinging signal energy on the diode multiplier 23 is transmitted back along transmission line 22. Arranged along both sides of transmission line 22 are a series of directional ring filters, $26_1$,14 $26_n$, as shown in FIG. 5. Each ring filter has a length equal to the wavelength of one of doubled frequencies, although, as mentioned above, selected filters are inoperative due to a severing of the ring. Signal energy at those frequencies which have an operable associated ring filter is coupled into those filters, while the remaining energy continues along the transmission line. The ring filters tuned to the highest frequency in the spectrum are nearest the diode multiplier 23 and successively located rings are tuned to successively lower frequencies, until the rings $26_{n-1}$ and $26_n$ nearest the slot antenna 21 are tuned to the lowest frequencies present in the spectrum.

When the signal energy is transmitted back along the transmission path 22, the energy present at the individual frequencies in the spectrum, as discussed above, will be coupled into their associated directional ring filters. Additional transmission lines 37 are provided on the outer sides of the ring filters, such that the energy present in the tuned rings may be coupled into a load 27 and dissipated. This coupling and subsequent dissipation of energy are selected frequencies in the doubled frequency spectrum occurs when there is a first coupling between the transmission line 22 (see FIG. 5) and a ring filter 26 which is tuned to one of the spectrum frequencies, and a second coupling from ring 26 to transmission line 37 into load 27. However, for those frequencies which are not coupled, because the ring filter is physically broken or inoperable because of some other reason, the associated signal energy will continue along the transmission line 22 back to transmitting antenna 28, where it is transmitted back to the transceiver 10.

Figure 2:
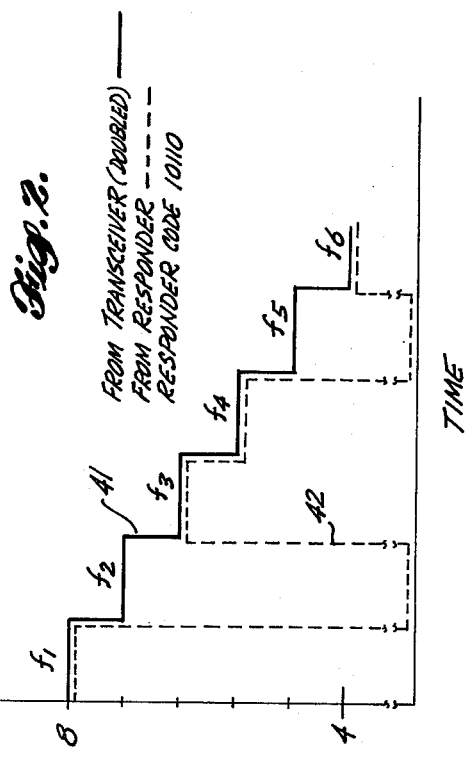
FIG. 2 is a signal diagram showing the relationships between the transmitted and received signals for a given responder code.

Referring to FIG. 2, a transmit-receive signal diagram is shown for an original spectrum comprising six frequencies $f_1$–$f_6$, and a given responder ring configuration. The solid stepped line 41 is representative of the frequency spectrum of the signal transmitted by the transceiver (doubled), which is thus substantially the signal spectrum reflected back from the diode converter 23 in responder 20, while the dashed line 42 indicates the frequency spectrum of the signal transmitted by the responder 20. The sharp dips in the signal from the responder indicate an absence of signal energy at those frequencies.

The spectrum "openings" at $F_2$ and $F_5$ in the signal from the responder 20 are demonstrated by the dashed lines of FIG. 2. The slight separation between the solid line and dashed line in FIG. 2 are for purposes of explanation clarity only. The dashed lines of FIG. 2 show that, at predetermined frequencies, no signal energy is radiated back toward the transceiver 11 by the responder 20. Each responder unit in the system has a different configuration of complete versus incomplete ring filters, such that each responder will radiate a unique pattern of energy back to the transceiver with respect to the originally transmitted frequency spectrum.

Referring again to FIG. 1, the energy radiated back from the responder unit 20 (not shown) to the transceiver 10 is applied as one input 19 to mixer 18. The other input to mixer 18 is the output of filter 17. The source of this output signal is VCO 11, the output of which is applied to a X2 multiplier circuit 13, which doubles all the frequencies in the swept frequency spectrum generated by the VCO 11, identically to that of the diode converter 23 in the responder 20. Thus, the output of the multiplier 13 in transceiver 10 is substantially identical in frequency coverage with the output of the diode converter 23 in the responder 20.

The output of multiplier 13 is applied as one input to a conventional mixer 14, which, in combination with the signal from local oscillator 16, provides a frequency offset of the multiplied frequency spectrum output from multiplier 13, thereby resulting in improved recognition by the transceiver of the signal 19 from existing background noise. The local oscillator 16, under the control of logic and control circuit 12, generates a signal having a frequency on the order of 30 megacycles. The output of the mixer 14 is the sum and difference frequencies between the doubled frequency signals from the multiplier 13 and the frequency of the local oscillator 16. The sum and difference frequencies are then applied to a filter circuit 17, which typically filters out the high frequencies, e.g. sum frequencies, and passes the low frequencies, e.g. difference frequencies, to mixer 18. Thus, if the output of the VCO 11 at any one point in the frequency spectrum is arbitrarily defined as $F_0$, the output of multiplier 13 at that frequency point will be $2F_0$; the output of mixer 14 will be $2F_0 \pm 30$ megahertz, and the output of filter 17 will be $2F_0 - 30$ megahertz. $F_0$ in the present invention would be in the range of 2–4 gigahertz.

Figure 3:
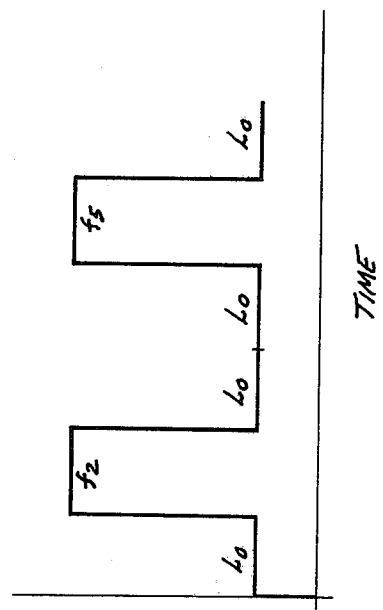
FIG. 3 is a signal diagram of the output of one stage of the transceiver portion of the passive identification system.

As mentioned above, the other input to mixer 18 is the signal 19 transmitted by the responder 20, which signal is the doubled frequency spectrum similar to the output of filter 17, except with energy "openings" at those frequencies where energy was coupled away from transmission line 22 in the responder 20 by complete filter rings. This predetermined deletion of energy at certain frequencies may be considered to be a type of modulation of the responder doubled frequency spectrum. The signal 19 present at mixer 18 at any frequency $F_0$ can then be defined as $2F_0$ plus the responder modulation at that frequency. The output of mixer 18 will be the sum and difference frequencies between the two inputs. Filter 31 will remove the sum frequencies, and provide as an output the difference frequencies. Thus, the output signal frequency of filter 31 at each step in the spectrum will be equal to $2F_0 - 30$ megahertz $- (2F_0 + \text{modulation})$, where $F_o$ refers to the origginal VCO frequency of each step. Referring to FIG. 3, the idealized output of the filter 18, in terms of amplitude v. time, is shown for the frequency response diagram of FIG. 2.

The output of filter 31 depends on the presence or absence of returning frequency energy from the responder 20 at the successive doubled spectrum frequencies. The presence of energy at a particular frequency in the signal from the responder, when mixed in mixer 18 with the output of filter 17 will result in a small frequency difference signal $L_o$ in that time slot of the spectrum equal to the frequency output of local oscillator 16. In operation, it is significantly easier to detect lower power signals, such as those typically transmitted by the responder, when the mixer 18 output is not allowed to go to DC. Thus, the local oscillator 16 forces the output of the mixer 18 to be always offset from the DC level, thus making the received signal easier to detect from the background noise.

Referring to FIGS. 2 and 3, the presence of energy at a particular frequency in the signal transmitted by a responder will result in the output of filter 31 during that time period being a small amplitude signal having a frequency $L_o$ equal to that of the local oscillator, as explained above. However, when there is an absence of energy at a particular frequency in the responder transmitted signal, such as shown for frequency $f_2$ in FIG. 2, indicating that energy at that frequency has been coupled into its associated ring filter in the responder and dissipated, the amplitude of the differnce frequency output of the filter 31 will increase significantly, as shown.

The presence of energy at a particular frequency in the signal transmitted by the responder 20 will thus result in a low amplitude, small frequency signal, which may be conveniently defined as binary zero, while the absence of energy at a particular frequency in ths signal from the responder will result in a relatively high amplitude output at that frequency, which signal may be conveniently defined as a binary one.

The output of filter 31 is applied to a detector 32, (FIG. 1) which distinguishes in time the large amplitude pulse "one" output from the low amplitude "zero" output. The output of detector 32 is then applied to a comparator circuit 33 which compares the output of detector 32 with a clock signal having a predetermined frequency and amplitude from clock circuit 34. The comparator 33 assigns a "one" to the time slot in the spectrum where a large amplitude pulse appears and assigns a "zero" to that time slot in the spectrum where no pulse appears. Thus, a digital word is created with "ones" corresponding to an absence of signal energy from the responder at a particular frequency in the spectrum, and "zeros" corresponding to a presence of signal energy from the responder at a particular frequency. This arrangement may, of course, be inverted for convenience. Thus, the digital word for the example of FIGS. 2 and 3 would be 010010. This digital word, which uniquely identifies a particular responder and hence the animal or article on which it is located with respect to all other responders in the system, is then applied to standard display circuitry 35. The display circuitry typically consists of either visual display means, such as neon tubes or the like, or a printing device, for readout of the actual number of the animal or article being identified. Additionally, the number may be applied to a computer for processsing of individual records. For instance, if an animal is weighed automatically after it is identified, a computer can be used to address the animal's weight records, and the weight measured may then be entered immediately into the animal's records. Evaluation of growth rate versus feed costs for a particular animal may then be easily made, so as to maximize decisions regarding the animal 3 s future feeding, and to determine the most appropriate time to put the animal to market.

Thus, a system has been described which is capable of uniquely identifying one animal or article from a large number of similar animals or articles. Each article bears a passive responder device, which , in conjunction with a single transceiver, is capable of uniquely identifying its bearer. This allows for identification of animals and articles in an accurate and inexpensive manner.

Although a preferred embodiment of the invention has been disclosed herein for purposes of illustration, it should be understood that various changes, modification and substitutions may be incorporated in such embodiment without departing from the spirit of the invention as defined by the claims which follow.

What is claimed is:

1. A passive identification system using a given range of frequencies for communication between a transceiver and at least one passive responder, comprising:

signal generating means in said transceiver for generating a frequency spectrum signal within said given frequency range, which frequency spectrum signal comprises a series of successive discrete frequencies;

means for transmitting said frequency spectrum to a passive responder, which responder retransmits to said transceiver selected frequencies from said series of successive discrete frequencies;

means in said transceiver and said responder for changing the frequency of each of said successive discrete frequencies by a given factor;

means in said transceiver for comparing said frequency spectrum with said retransmitted selected frequencies so as to determine coincidence between each of said frequency changed successive discrete frequencies transmitted to said responder, and the selected frequencies retransmitted from said responder to said transceiver; and, means responsive to said comparing means for generating an identification code indicative of said coincidence with respect to each successive discrete frequency in said frequency spectrum signal.

2. An apparatus in accordance with claim 1, wherein said system includes a plurality of responders.

3. An apparatus in accordance with claim 2, wherein said given frequency range is one frequency octave.

4. An apparatus according to claim 1, including means for offsetting the frequency of each of said series of successive discrete frequencies by a specified small amount compared to said discrete frequencies, and offsetting means operable only on the series of successive discrete frequencies otherwise applied to said comparing means.

5. An apparatus according to claim 1, wherein said frequency changing means is a multiplier with a factor of 2.

6. An apparatus according to claim 1, wherein said comparing means includes a mixer having two inputs, one input coupled to said frequency offsetting means, and the other input responsive to said retransmitted selected frequencies from said responder, said mixer generating sum and difference frequencies of said two inputs.

7. An apparatus according to claim 6, wherein said comparing means further includes a detector, coupled to said mixer, for determining the presence or absence of retransmitted frequencies identical to any one of said series of successive discrete frequencies.

8. An apparatus according to claim 7, including a clock generator, and wherein said code generating means is a comparator, which comparator is responsive to said detector and said clock generator a binary code which is dependent on the presence or absence of a selected frequency identical to each of said series of successive discrete frequencies, the presence of a coincidence between one of said series of successive discrete frequencies and one of said selected frequencies being represented by one binary character, and the absence of a coincidence between one of said series of successive discrete frequencies and said selected frequencies being represented by the other binary character.

9. An apparatus according to claim 8, including display means, coupled to said comparator for presenting said code in recognizable form.

* * * * *

UNITED STATES PATENT OFFICE
CERTIFICATE OF CORRECTION

PATENT NO. : 3,878,528
DATED : April 15, 1975
INVENTOR(S) : Henrie L. Majeau

It is certified that error appears in the above-identified patent and that said Letters Patent are hereby corrected as shown below:

Column 9, line 9, add the words --to generate-- after the word "generator".

Column 8, line 54, delete the word "and", and insert therefor the word --said--.

Signed and Sealed this thirtieth Day of September 1975

[SEAL]

Attest:

RUTH C. MASON
Attesting Officer

C. MARSHALL DANN
Commissioner of Patents and Trademarks